(12) United States Patent
Lissianski et al.

(10) Patent No.: US 7,662,353 B2
(45) Date of Patent: Feb. 16, 2010

(54) METHODS AND SYSTEMS FOR REMOVING MERCURY FROM COMBUSTION FLUE GAS

(75) Inventors: Vitali Victor Lissianski, San Juan Capistrano, CA (US); Peter Martin Maly, Lake Forest, CA (US); William Randall Seeker, San Clemente, CA (US)

(73) Assignee: General Electric Company, Schenectady, NY (US)

( * ) Notice: Subject to any disclaimer, the term of this patent is extended or adjusted under 35 U.S.C. 154(b) by 212 days.

(21) Appl. No.: 11/674,786

(22) Filed: Feb. 14, 2007

(65) Prior Publication Data

US 2008/0193352 A1 Aug. 14, 2008

(51) Int. Cl.
*B01D 53/64* (2006.01)
*B01D 53/74* (2006.01)
*C10L 5/00* (2006.01)

(52) U.S. Cl. .................... 423/210; 422/168; 44/620; 44/621

(58) Field of Classification Search ............... 423/210; 422/168; 44/620, 621
See application file for complete search history.

(56) References Cited

U.S. PATENT DOCUMENTS

| | | | |
|---|---|---|---|
| 3,849,267 A | 11/1974 | Hilgen et al. | |
| 4,273,747 A | 6/1981 | Rasmussen | |
| 5,507,238 A | 4/1996 | Knowles | |
| 5,900,042 A | 5/1999 | Mendelsohn et al. | |
| 6,136,281 A | 10/2000 | Meischen et al. | |
| 6,447,740 B1 | 9/2002 | Caldwell et al. | |
| 6,878,358 B2 | 4/2005 | Vosteen et al. | |
| 7,288,233 B2 * | 10/2007 | Breen et al. ............... | 423/210 |
| 2006/0102057 A1 * | 5/2006 | Aradi et al. ............... | 110/345 |
| 2006/0120934 A1 | 6/2006 | Lanier et al. | |
| 2007/0116616 A1 | 5/2007 | Taylor | |
| 2007/0168213 A1 * | 7/2007 | Comrie .................... | 705/1 |
| 2008/0011158 A1 | 1/2008 | Barger et al. | |

* cited by examiner

*Primary Examiner*—Timothy C Vanoy
(74) *Attorney, Agent, or Firm*—Armstrong Teasdale LLP

(57) ABSTRACT

A method of reducing mercury emissions using a combustion device including at least a combustion zone. The method includes receiving a flow of fuel including mercury at the combustion device assembly; injecting a first mercury oxidizer flow including $MgCl_2$ on the fuel upstream of the combustion device assembly; and oxidizing the mercury using a mercury oxidizer flows and the combustion device assembly.

20 Claims, 3 Drawing Sheets

METHODS AND SYSTEMS FOR REMOVING MERCURY FROM COMBUSTION FLUE GAS

BACKGROUND OF THE INVENTION

This invention relates generally to combustion devices and, more particularly, to emission control systems for combustion devices.

During a typical combustion process within a furnace or boiler, for example, a flow of combustion gas is produced. The combustion gas contains combustion products including, without limitation, carbon dioxide, carbon monoxide, water, hydrogen, nitrogen and mercury generated as a direct result of combusting solid and/or liquid fuels. Before the combustion gas is emitted into the atmosphere, hazardous or toxic combustion products, such as mercury emissions and oxides of nitrogen ($NO_x$), are to be removed according to EPA or state governmental regulations, standards and procedures.

At least some conventional methods of removing mercury from combustion gases include injecting activated carbon into the combustion gas as the combustion gases flow through duct work. However, with such methods, it may be difficult to obtain uniform distribution of the particulate matter within the duct work. As a result of poor mixing and/or carbon fallout, mercury may not be efficiently removed from the combustion gases. In an attempt to solve such problems, an injection rate of activated carbon is increased, which may further exacerbate the problems associated with the conventional methods.

BRIEF DESCRIPTION OF THE INVENTION

In one aspect, a method is provided for reducing mercury emissions using at least a solid fuel, furnace and flue gas system assembly. The method includes receiving a flow of fuel including mercury at the furnace assembly, injecting a flow of a solution including injecting a flow of mercury oxidizer $MgCl_2$, and oxidizing the mercury using the mercury oxidizer $MgCl_2$ and furnace assembly.

In another aspect, a furnace assembly is provided. The assembly includes a furnace combustion zone configured to facilitate at least an oxidation reaction of mercury. The assembly also includes a first injection port positioned at the furnace combustion zone. The injection port is configured to inject a flow of mercury oxidizer $MgCl_2$.

In another aspect, a furnace combustion zone exhaust system includes a combustion chamber configured to combust materials including mercury such that mercury exits the combustion chamber in a flow of exhaust. The system also includes a furnace configured to facilitate at least an oxidation reaction of mercury and a second injection port positioned downstream of the furnace combustion zone. The second injection port is configured to inject a flow of mercury oxidizer $MgCl_2$.

DETAILED DESCRIPTION OF THE INVENTION

An exemplary embodiment of the present invention provides a method and system for continuously removing and reducing hazardous and/or toxic compounds, such as mercury emissions from a flow of combustion gas produced during a combustion process within a furnace or boiler, for example. The flow of combustion gas having combustion products including, without limitation, carbon dioxide, carbon monoxide, water, hydrogen, nitrogen and mercury. This combustion gas is a direct result of combusting solid and/or liquid fuels. Before the flow of combustion gas is exhausted into the atmosphere, any toxic combustion products, such as mercury and oxides of nitrogen ($NO_x$), are removed according to governmental and environmental regulations and standards.

The method is described below in reference to its application in connection with and operation of a system for continuously removing mercury from a supply of combustion gas generated during a combustion process. However, it will be obvious to those skilled in the art and guided by the teachings herein provided that the methods and systems described herein are likewise applicable to any combustion device including, without limitation, boilers and heaters, and may be applied to systems consuming fuels such as coal, oil or any solid, liquid or gaseous fuel.

As used herein, references to "particulate matter" are to be understood to refer to particulate matter contained within the combustion gas. The particulate matter includes particles of matter including, without limitation, fly ash and carbon, contained within the combustion gas as a naturally occurring product of a combustion process, and may also include externally-introduced matter including, without limitation, at least one of active carbon particles and additional fly ash, recirculated or injected into the particulate matter contained within the combustion gas.

Figure 1:
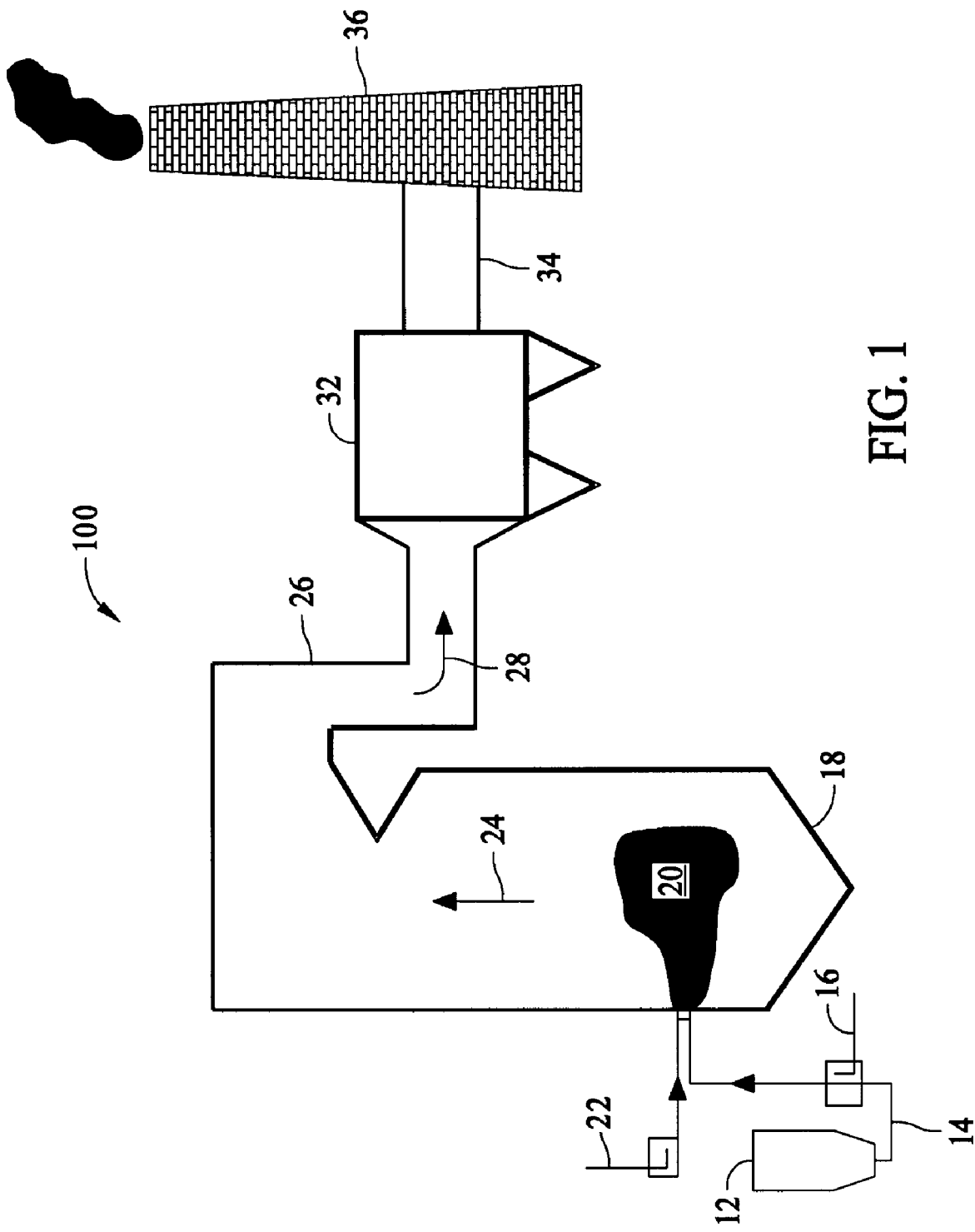
FIG. 1 is a schematic view of an exemplary power plant system in accordance with one aspect of the invention.

FIG. 1 is a schematic view of an exemplary power plant system 100 according to one embodiment of the present invention. In the exemplary embodiment, system 100 includes a fuel storage device 12 such as but not limited to a bin, bunker, pile or silo in which a fuel supply is stored and collected prior to transport for combustion. The fuel storage device 12 is coupled in flow communication with a fuel transport device 14 which includes but is not limited to a feeder and piping arrangement used to transport fuel for combustion. A first injection port 16 extends into fuel transport device 14 and provides flow communication to fuel transport device 14. In an alternative embodiment, first injection port 16 is positioned upstream of fuel storage device 12. In the exemplary embodiment, system 100 includes a furnace combustion device 18 that combusts a plurality of fuels, such as but not limited to coal, oil, or any solid, liquid or gaseous fuels in which a supply of combustion gases is produced. Combustion device 18 includes a combustion zone 20 wherein a fuel-air mixture is combusted causing a stream of high temperature combustion gas 24 to be generated.

Fuel transport device 14 is coupled to combustion device 18 and is in flow communication therewith. Contained within combustion device 18 is a fuel combustion zone 20. In the exemplary embodiment, an air injection port 22 extends into combustion device 18 and channels and is in flow communication with combustion zone 20. In an alternative embodiment, a second injection port extends into combustion device 18 and is in flow communication with combustion zone 20. In an alternative embodiment, a third injection port extends into combustion device 18 downstream of combustion zone 20 and is in flow communication with a high temperature combustion gas 24. Combustion device 18 is coupled to a gas outlet duct 26 that is configured to direct a combustion exhaust gas 28 from combustion device 18. In the exemplary embodiment, a first injection port 16 extends into fuel transport device 14 and is configured to inject a flow of mercury oxidizer to the combustible materials directed through fuel transport device 14. First injection port 16 is formed as an injection tree, injection ring header or any other injection device configured to inject a flow of mercury oxidizer.

In an alternative embodiment, the first injection port is positioned upstream of fuel storage device 12 to provide mercury oxidizer flow to the combustible materials directed to fuel storage device 12. In the exemplary embodiment, the first mercury oxidizer is injected on the combustible materials in the fuel transport device. Fuel transport device 14 provides a flow of combustible materials including the first mercury oxidizer to combustion device 18.

In the exemplary embodiment, combustion device 18 is configured to combust a plurality of fuels, such as but not limited to coal, oil, or any solid, liquid or gaseous fuels in which a supply of combustion gases are produced. Combustion device 18 is configured with a combustion zone 20 wherein a fuel-air mixture is combusted causing a stream of high temperature combustion gas 24 to be generated. In an alternative embodiment, combustion device 18 is configured with but not limited to, additional combustion gas emission reducing equipment such as over fire air injection ports and gas reburn systems that have a temperature in excess of 2500 degrees Fahrenheit. In the exemplary embodiment, air injection port 22 extends into combustion device 18 to provide combustion air flow to combustion zone 20. In an alternative embodiment, a second injection port is configured with combustion device 18 to provide a mercury oxidizer flow to combustion zone 20. In an alternative embodiment, a third injection port is configured with combustion device 18 downstream of combustion zone 20 to provide mercury oxidizer flow to high temperature combustion gas 24.

More specifically, combustion exhaust gases 28 are contained in gas outlet duct 26, or other suitable connection, which directs combustion exhaust gas 28 through system 100. Gas outlet duct 26 generally provides flow communication between components of system 100 through a passage in which combustion exhaust gas 28 is channeled. It is apparent to those skilled in the art and guided by the teachings herein provided that gas outlet duct 26 may have any suitable size, shape and/or diameter to accommodate any supply of combustion gas produced during the described combustion process.

In the exemplary embodiment, gas outlet duct 26 is coupled to a pollution control device 32 and is in flow communication therewith. Pollution control device 32 is coupled to exit duct 34 and is in flow communication therewith. Exit duct 34 is coupled to chimney 36 and is in flow communication to chimney 36. Exit gases are released into the atmosphere through chimney 36.

In operation, a stream of high temperature combustion gas 24 is generated and directed to flow through gas outlet duct 26. Combustion gas 24 is discharged as combustion exhaust gas 28. Combustion exhaust gas 28 is directed to pollution control device 32. It is apparent to those skilled in the art and guided by the teachings herein provided that pollution control device 32 may have any suitable size, shape and/or diameter to accommodate any supply of combustion exhaust gas 28 produced during the described combustion process. Pollution control device 32 includes for example, but is not limited to a selective catalyst reduction device, an electrostatic precipitator, a baghouse, an activated carbon injection device, a flue gas desulfurization device, and/or any other mercury emission, nitrogen oxide emission and particulate emission control system technologies. Pollution control device 32 discharges into and provides a flow stream to exit duct 34 which directs a flow stream to chimney 36. Exit gases are released into the atmosphere through chimney 36.

In operation, system 100 facilitates continuously removing and reducing hazardous and/or toxic compounds, such as mercury emissions from the high temperature combustion gas stream produced during combustion within combustion device 18.

In one exemplary embodiment, a method of injecting a mercury oxidizer upstream of combustion device 18 is presented. As used herein, a mercury oxidizer relates to an ion in solution or compound that combines with a mercury atom. In the exemplary embodiment, the mercury oxidizer includes $MgCl_2$, which is stable up to 2600 degrees Fahrenheit. Specifically, in one embodiment, the mercury oxidizer includes at least one of a powder including $MgCl_2$ and an aqueous solution including $MgCl_2$. $MgCl_2$ has a solubility in water of 54 g/100 ml and, therefore, an aqueous solution may contain up to 54% $MgCl_2$. In another embodiment, the mercury oxidizer includes $MgCl_2$ along with air. The efficiency of mercury removal can be improved by adding $MgCl_2$ to the materials to be combusted. In an alternative embodiment, the efficiency of mercury removal can be improved by injecting $MgCl_2$ into the flue gas. In the exemplary embodiment, the solution is added in a ratio of approximately 0.5 pounds to approximately 3 pounds of $MgCl_2$ per approximately one ton of coal. Thermal decomposition of $MgCl_2$ produces Cl-containing species (HCl, $Cl_2$, and Cl) which results in improved mercury oxidation and improves the efficiency of mercury removal. In an alternative embodiment, a method is provided of improving the efficiency of mercury removal by, for example, activated carbon injection, wet scrubbers and other mercury control technologies.

Figure 2:
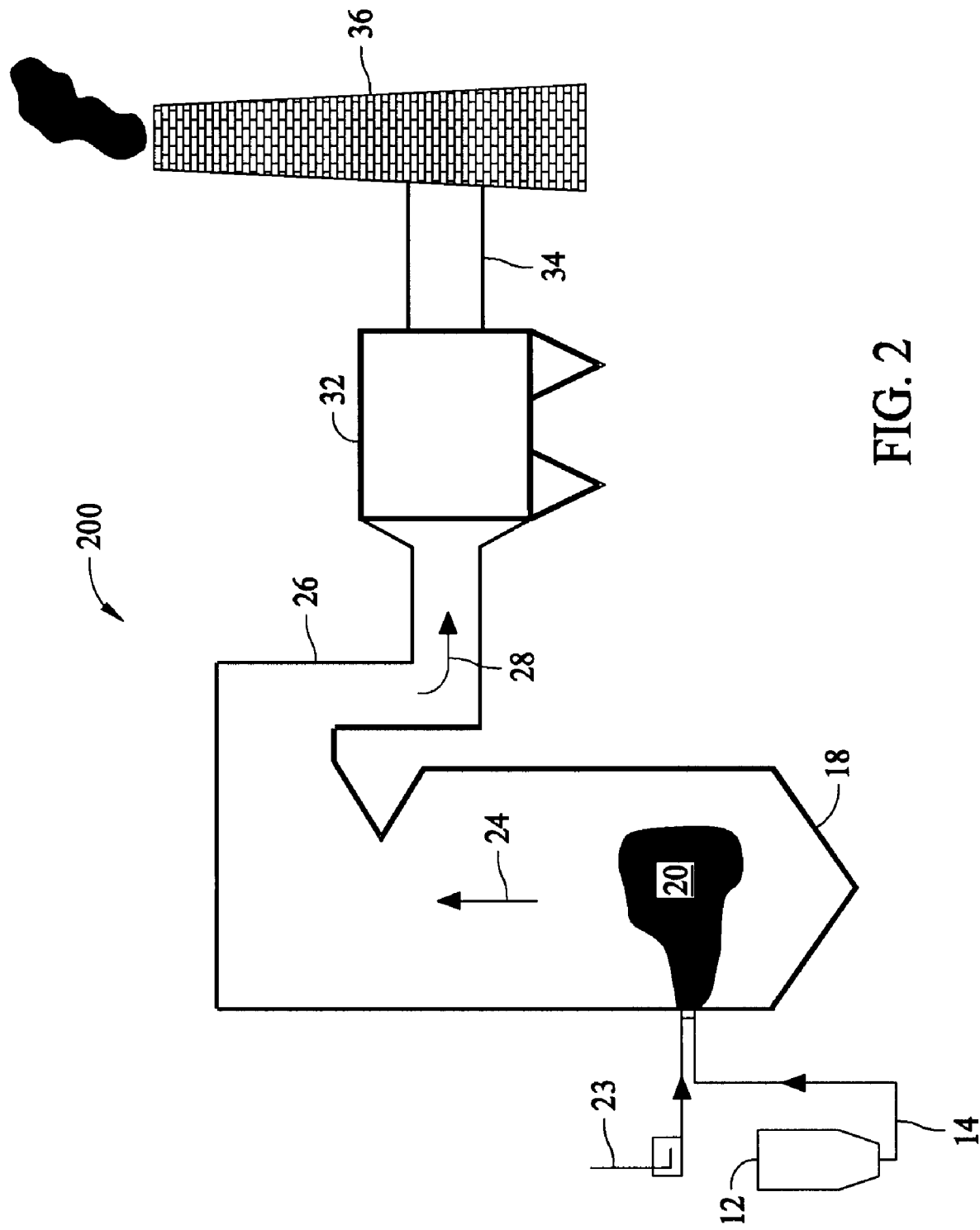
FIG. 2 is a schematic view of an exemplary power plant system that may be used to facilitate removing mercury emissions from combustion gases generated with the power plant system shown in FIG. 1.

FIG. 2 is a schematic view of an exemplary power plant system 200 according to one embodiment of the present invention. System 200 components 12, 14, 18, 20, 24, 26, 28, 32, 34 and 36 are also illustrated in FIG. 1.

In the exemplary embodiment, system 200 includes a fuel storage device 12 such as but not limited to a bin, bunker, pile or silo in which a fuel supply is stored and collected prior to transport for combustion. Fuel storage device 12 is coupled in flow communication with a fuel transport device 14 which includes but is not limited to a feeder and piping arrangement used to transport fuel for combustion. In an alternative embodiment, an injection port extends into fuel transport device 14 and provides flow communication to fuel transport device 14. Fuel transport device 14 is coupled to combustion device 18 and provides flow communication to combustion device 18. Contained within combustion device 18 is fuel combustion zone 20. In the exemplary embodiment, a second injection port 23 extends into combustion device 18 and channels and is in flow communication with combustion zone 20. In an alternative embodiment, a third injection port extends into combustion device 18 downstream of combustion zone 20 and channels and is in flow communication with high temperature combustion gas 24.

In the exemplary embodiment, system 200 includes a furnace combustion device 18 that combusts a plurality of fuels, such as but not limited to coal, oil, or any solid, liquid or gaseous fuels in which a supply of combustion gases are produced. Combustion device 18 includes a combustion zone 20 wherein a fuel-air mixture is combusted causing a stream of high temperature combustion gas 24 to be generated. Combustion device 18 is coupled to gas outlet duct 26 that is configured to channel combustion exhaust gas 28 from combustion device 18.

More specifically, combustion exhaust gases 28 are contained in gas outlet duct 26, or other suitable connection, which directs combustion exhaust gas 28 through system 200. Gas outlet duct 26 generally provides flow communication between components of system 200 through a passage in which combustion exhaust gas 28 is channeled. It is apparent to those skilled in the art and guided by the teachings herein provided that gas outlet duct 26 may have any suitable size, shape and/or diameter to accommodate any supply of combustion gas produced during the described combustion process.

In the exemplary embodiment, gas outlet duct 26 is coupled to a pollution control device 32 and is in flow communication therewith. Pollution control device 32 is coupled to exit duct 34 and is in flow communication therewith. Exit duct 34 is coupled to chimney 36 and is in flow communication with chimney 36. Exit gases are released into the atmosphere through chimney 36.

In operation, system 200 facilitates continuously removing and reducing hazardous and/or toxic compounds, such as mercury emissions from the stream of high temperature combustion gas 24 produced during combustion within combustion device 18.

Fuel storage device 12 provides the combustible materials in flow communication with fuel transport device 14 which includes but is not limited to a feeder and piping arrangement used to transport fuel for combustion. In an alternative embodiment, a first injection port extends into fuel transport device 14 and is configured to inject a flow of mercury oxidizer to the combustible materials directed through fuel transport device 14. In another embodiment, a first injection port is positioned upstream of fuel storage device 12 and provides mercury oxidizer to the combustible materials directed to fuel storage device 12. Fuel transport device 14 provides a flow of combustible materials including the mercury oxidizer to combustion device 18.

In the exemplary embodiment, combustion device 18 is configured to combust a plurality of fuels, such as but not limited to coal, oil, or any solid, liquid or gaseous fuels in which a supply of combustion gases are produced. Combustion device 18 is configured with a combustion zone 20 wherein a fuel-air mixture is combusted causing a stream of high temperature combustion gas 24 to be generated. In an alternative embodiment, combustion device 18 is configured with but not limited to, additional combustion gas emission reducing equipment such as over fire air injection ports and gas reburn systems.

In an alternative embodiment, an air injection port 22 (shown in FIG. 1) is coupled with combustion device 18 to provide combustion air flow to combustion zone 20. In the exemplary embodiment, a second injection port 23 is coupled with combustion device 18 to provide a mercury oxidizer flow to combustion zone 20. Second injection port 23 is formed as an injection tree, injection ring header or any other injection device configured to inject a flow of mercury oxidizer. In an alternative embodiment, a third injection port is coupled with combustion device 18 downstream of combustion zone 20 to provide mercury oxidizer flow to high temperature combustion gas 24.

In one exemplary embodiment, a method is provided of injecting a mercury oxidizer on the materials to be combusted in combustion zone 20 of combustion device 18. The mercury oxidizer, in one embodiment, is at least one of an ion in solution and a compound that combines with a mercury atom. In the exemplary embodiment, the mercury oxidizer includes $MgCl_2$, which is stable up to 2600 degrees Fahrenheit. Specifically, in one embodiment, the mercury oxidizer includes at least one of a powder including $MgCl_2$ and an aqueous solution including $MgCl_2$. $MgCl_2$ has a solubility in water of 54 g/100 ml and, therefore, an aqueous solution may contain up to 54% $MgCl_2$. In another embodiment, the mercury oxidizer includes $MgCl_2$ along with air. The efficiency of mercury removal can be improved by injecting $MgCl_2$ to the materials to be combusted in combustion zone 20. In an alternative embodiment, the efficiency of mercury removal can be improved by injecting $MgCl_2$ into the flue gas downstream of combustion zone 20. In another alternative embodiment, the efficiency of mercury removal can be improved by injecting $MgCl_2$ into the materials to be combusted upstream of combustion device 18. In the exemplary embodiment, the solution is added in a ratio of approximately 0.5 pounds to approximately 3 pounds of $MgCl_2$ per approximately one ton of coal. Thermal decomposition of $MgCl_2$ produces Cl-containing species (HCl, $Cl_2$, and Cl) which results in improved mercury oxidation and improves the efficiency of mercury removal. In an alternative embodiment, a method is provided of improving the efficiency of mercury removal by using activated carbon injection, wet scrubbers and other mercury control technologies.

In the exemplary embodiment, system 200 generates a stream of high temperature combustion gas 24 that is in flow communication with gas outlet duct 26 and is discharged as combustion exhaust gas 28. Combustion exhaust gas 28 is in flow communication with pollution control device 32. It is apparent to those skilled in the art and guided by the teachings herein provided that pollution control device 32 may have any suitable size, shape and/or diameter to accommodate any supply of combustion exhaust gas 28 produced during the described combustion process. Pollution control device 32 includes, for example, but is not limited to, a selective catalyst reduction device, an electrostatic precipitator, a baghouse, an activated carbon injection device, a flue gas desulfurization device, and/or any other mercury emission, nitrogen oxide emission and particulate emission control system technologies. Pollution control device 32 discharges flow to exit duct 34 which directs flow to chimney 36. Exit gases are released into the atmosphere through chimney 36.

Figure 3:
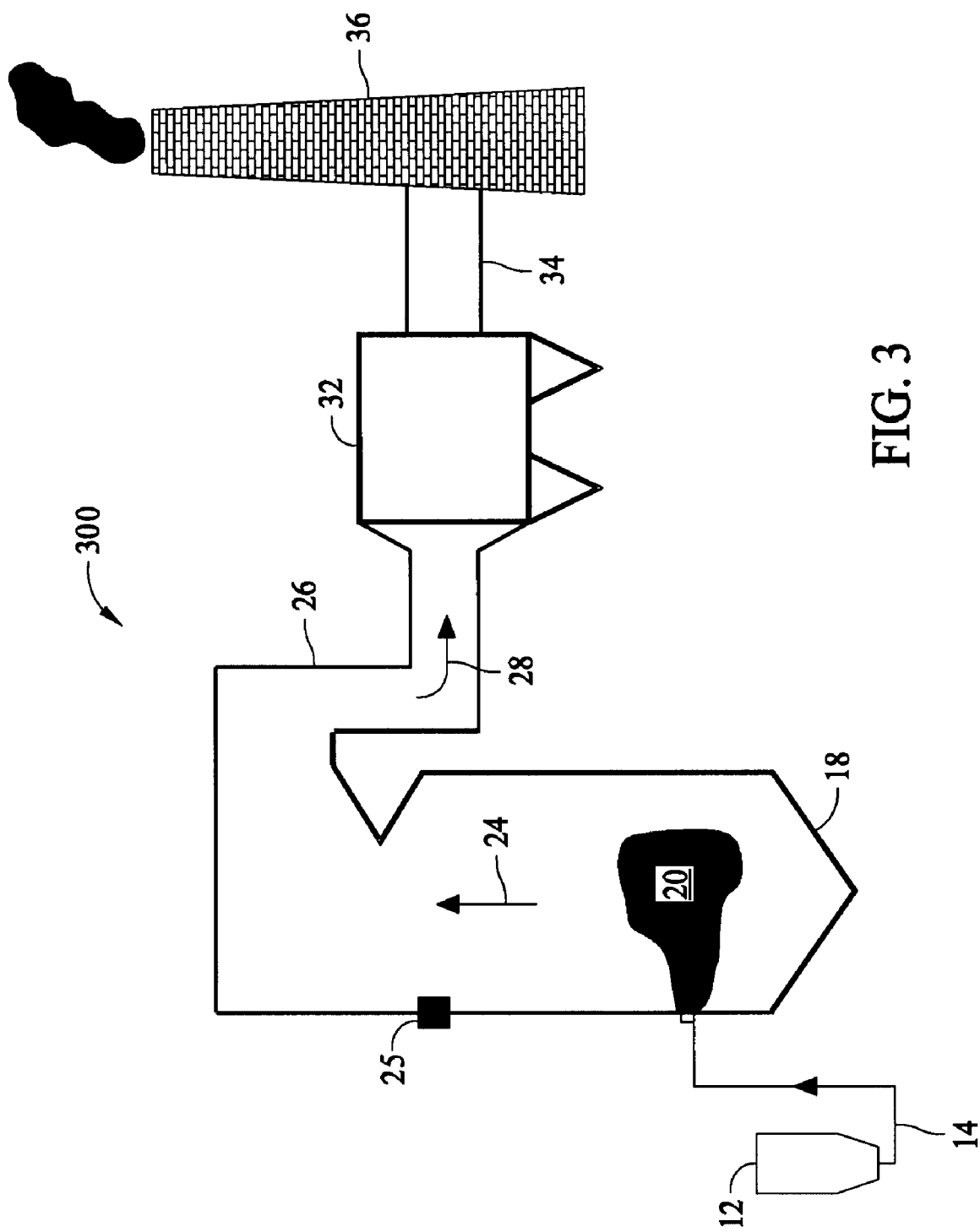
FIG. 3 is a schematic view of an exemplary power plant system that may be used to facilitate removing mercury emissions from combustion gases generated with the power plant system shown in FIG. 1 and FIG. 2.

FIG. 3 is a schematic view of an exemplary power plant system 300 according to one embodiment of the present invention. System 300 components 12, 14, 18, 20, 24, 26, 28, 32, 34 and 36 are also shown in FIGS. 1 and 2. In the exemplary embodiment, system 300 includes a fuel storage device 12 such as but not limited to a bin, bunker, pile or silo in which a fuel supply is stored and collected prior to transport for combustion. Fuel storage device 12 is coupled in flow communication with a fuel transport device 14 which includes but is not limited to a feeder and piping arrangement used to transport fuel for combustion. In an alternative embodiment, the first injection port extends into fuel transport device 14 and is in flow communication therewith. Fuel transport device 14 is coupled to combustion device 18 and is in flow communication therewith. Contained within combustion device 18 is fuel combustion zone 20. In an alternative embodiment, the second mercury oxidizer injection port extends into combustion device 18 and is in flow communication with combustion zone 20. The third mercury oxidizer injection port 25 extends into combustion device 18 downstream of combustion zone 20 and is in flow communication with high temperature combustion gas 24.

In the exemplary embodiment, system 300 includes a furnace combustion device 18 that combusts a plurality of fuels, such as but not limited to coal, oil, or any solid, liquid or gaseous fuels in which a supply of combustion gases is produced. Combustion device 18 includes a combustion zone 20 wherein a fuel-air mixture is combusted causing a stream of high temperature combustion gas 24 to be generated. Combustion device 18 is coupled to gas outlet duct 26 that is configured to channel combustion exhaust gas 28 from combustion device 18.

More specifically, combustion exhaust gases 28 are contained in gas outlet duct 26, or other suitable connection, which directs combustion exhaust gas 28 through system 300. Gas outlet duct 26 generally provides flow communication between components of system 300 through a passage in which combustion exhaust gas 28 is channeled. It is apparent to those skilled in the art and guided by the teachings herein provided that gas outlet duct 26 may have any suitable size, shape and/or diameter to accommodate any supply of combustion gas produced during the described combustion process.

In the exemplary embodiment, gas outlet duct 26 is coupled to a pollution control device 32 and is in flow communication therewith. Pollution control device 32 is coupled to exit duct 34 and is in flow communication therewith. Exit duct 34 is coupled to chimney 36 and provides flow communication to chimney 36. Exit gases are released into the atmosphere through chimney 36.

In operation, system 300 facilitates continuously removing and reducing hazardous and/or toxic compounds, such as mercury emissions from the stream of high temperature combustion gas 24 produced during combustion within combustion device 18. Fuel storage device 12 provides the combustible materials in flow communication with fuel transport device 14 which includes but is not limited to a feeder and piping arrangement used to transport fuel for combustion. In an alternative embodiment, a first injection port extends into fuel transport device 14 and is configured to inject a flow of mercury oxidizer into the combustible materials directed through fuel transport device 14. In another alternative embodiment, a first injection port is positioned upstream of fuel storage device 12 to provide mercury oxidizer flow to the combustible materials directed to fuel storage device 12. Fuel transport device 14 provides a flow of combustible materials including the first mercury oxidizer to combustion device 18.

In the exemplary embodiment, combustion device 18 is configured to combust a plurality of fuels, such as but not limited to coal, oil, or any solid, liquid or gaseous fuels in which a supply of combustion gases is produced. Combustion device 18 is coupled with a combustion zone 20 wherein a fuel-air mixture is combusted causing a stream of high temperature combustion gas 24 to be generated. In an alternative embodiment, combustion device 18 is configured with but not limited to, additional combustion gas emission reducing equipment such as over fire air injection ports and gas reburn systems.

In an alternative embodiment, an air injection port is coupled with combustion device 18 to provide combustion air flow to combustion zone 20. In another alternative embodiment, a second injection port is coupled with combustion device 18 to provide a mercury oxidizer flow to combustion zone 20. In the exemplary embodiment, a third injection port 25 is coupled with combustion device 18 downstream of combustion zone 20 to provide mercury oxidizer flow to high temperature combustion gas 24. The third injection port 25 is formed as an injection tree, injection ring header or any other injection device configured to inject a flow of mercury oxidizer. The mercury oxidizer includes, in one embodiment, at least one of an ion in solution and compound that combines with a mercury atom. In the exemplary embodiment, the mercury oxidizer includes $MgCl_2$, which is stable up to 2600 degrees Fahrenheit. Specifically, in one embodiment, the mercury oxidizer includes at least one of a powder including $MgCl_2$ and an aqueous solution including $MgCl_2$. $MgCl_2$ has a solubility in water of 54 g/100 ml and, therefore, an aqueous solution may contain up to 54% $MgCl_2$. In another embodiment, the mercury oxidizer includes $MgCl_2$ along with air. The efficiency of mercury removal can be improved by injecting $MgCl_2$ into the flue gas downstream of the combustion zone 20. In an alternative embodiment, the efficiency of mercury removal can be improved by injecting $MgCl_2$ to the materials to be combusted in combustion zone 20. In another alternative embodiment, the efficiency of mercury removal can be improved by injecting $MgCl_2$ into the materials to be combusted upstream of combustion device 18. In the exemplary embodiment, the solution is added in a ratio of approximately 0.5 pounds to approximately 3 pounds of $MgCl_2$ per approximately one ton of coal. Thermal decomposition of $MgCl_2$ produces Cl-containing species (HCl, $Cl_2$, and Cl) which results in improved mercury oxidation and improves the efficiency of mercury removal. In an alternative embodiment, a method is provided of improving the efficiency of mercury removal by utilizing activated carbon injection, wet scrubbers and other mercury control technologies.

In the exemplary embodiment, system 300 includes a stream of high temperature combustion gas 24 that is generated and is in flow communication with gas outlet duct 26 and is discharged as combustion exhaust gas 28. Combustion exhaust gas 28 is in flow communication with pollution control device 32. It is apparent to those skilled in the art and guided by the teachings herein provided that pollution control device 32 may have any suitable size, shape and/or diameter to accommodate any supply of combustion exhaust gas 28 produced during the described combustion process. Pollution control device 32 includes, for example, at least one of a selective catalyst reduction device, an electrostatic precipitator, a baghouse, an activated carbon injection device, a flue gas desulfurization device, and/or any other mercury emission, nitrogen oxide emission and particulate emission control system technologies. Pollution control device 32 discharges flow to exit duct 34. Exit duct 34 is in flow communication with chimney 36. Exit gases are released into the atmosphere through chimney 36.

Exemplary embodiments of a method and system for continuously removing mercury from a supply of combustion gas are described above in detail. The method and system are not limited to the specific embodiments described herein, but rather, steps of the method and/or components of the system may be utilized independently and separately from other steps and/or components described herein. Further, the described method steps and/or system components can also be defined in, or used in combination with, other methods and/or systems, and are not limited to practice with only the method and system as described herein.

While the invention has been described in terms of various specific embodiments, those skilled in the art will recognize that the invention can be practiced with modification within the spirit and scope of the claims.

What is claimed is:

1. A method of reducing mercury emissions using a combustion device assembly including a fuel storage device, a fuel transport device, and a combustion device, said method comprising:

receiving a flow of fuel including mercury at the combustion device from the fuel storage device via the fuel transport device;

injecting a mercury oxidizer flow on one of the fuel upstream from the fuel storage device and into the fuel transport device, wherein the mercury oxidizer flow includes $MgCl_2$; and oxidizing the mercury in the combustion device using the mercury oxidizer flow.

2. A method in accordance with claim 1 wherein injecting a mercury oxidizer flow comprises injecting at least one of a powder including $MgCl_2$ and an aqueous solution including $MgCl_2$.

3. A method in accordance with claim 1 wherein injecting a mercury oxidizer flow comprises injecting a mixture of mercury oxidizer and air.

4. A method in accordance with claim 1 further comprising injecting a second mercury oxidizer flow in the combustion device assembly combustion zone.

5. A method in accordance with claim 4 wherein injecting a second mercury oxidizer flow comprises injecting a second mercury oxidizer flow including $MgCl_2$.

6. A method in accordance with claim 4 wherein injecting a second mercury oxidizer flow comprises injecting a mixture of mercury oxidizer and air.

7. A method in accordance with claim 1 further comprising injecting a second mercury oxidizer flow in the flue gas downstream of the combustion device assembly combustion zone.

8. A method in accordance with claim 7 wherein injecting a second mercury oxidizer flow comprises injecting a second mercury oxidizer including $MgCl_2$.

9. A method in accordance with claim 7 wherein injecting a second mercury oxidizer flow comprises injecting a mixture of mercury oxidizer and air.

10. A method in accordance with claim 1 further comprising injecting a mixture of mercury oxidizer including $MgCl_2$ and air in at least one of fly ash and active carbon particles in the flow of gas.

11. A method in accordance with claim 1 further comprising oxidizing the mercury to facilitate increasing a mercury capture efficiency of the at least one of fly ash and active carbon particles.

12. A combustion device assembly comprising:
a fuel storage device for storing a fuel that includes mercury contained therein;
a fuel transport device coupled to said fuel storage device;
a combustion device including a combustion zone, said combustion device configured to facilitate an oxidation reaction of mercury, said fuel transport device coupled to said combustion device for channeling a flow of fuel from said fuel storage device to said combustion device; and
a plurality of injection ports for injecting a flow of mercury oxidizer, said plurality of injection ports comprise at least a first injection port positioned upstream from said fuel storage device for injecting a flow of mercury oxidizer into fuel in said fuel storage device, said first injection port comprises an injection tree, said mercury oxidizer comprises at least one of a powder comprising $MgCl_2$ and an aqueous solution comprising $MgCl_2$.

13. A combustion device assembly in accordance with claim 12 wherein at least one of said injection ports is configured to inject $MgCl_2$ and air in at least one of fly ash and active carbon particles in the flow of gas.

14. A combustion device assembly in accordance with claim 12 further comprising a second injection port configured to inject a flow of mercury oxidizer into said combustion zone, and a third injection port configured to inject a flow of mercury oxidizer downstream from said combustion zone.

15. A combustion device assembly in accordance with claim 12 wherein the combustion device assembly comprises a coal-fired power plant.

16. A method of facilitating mercury oxidation in combustion gases comprising at least one of supplying a mercury oxidizer to fuel and injecting a mercury oxidizer into a combustion gas stream, said method comprises at least one of:
injecting the mercury oxidizer on one of the fuel upstream from a fuel storage device and into a fuel transport device prior to supplying the fuel to a combustor, wherein the mercury oxidizer includes $MgCl_2$;
injecting the mercury oxidizer and air into the combustion gas stream; and
injecting the mercury oxidizer downstream of a combustion zone defined in the combustor.

17. A method in accordance with claim 16 wherein the mercury oxidizer is at least one of a powder including $MgCl_2$ and an aqueous solution including $MgCl_2$.

18. A method in accordance with claim 16 wherein the mercury oxidizer and air are injected into the combustion gas stream downstream of a combustion zone.

19. A method in accordance with claim 16 wherein the mercury oxidizer and air are injected into the combustion gas stream at a combustion zone.

20. A method in accordance with claim 16 wherein the mercury oxidizer and air are injected into the combustion gas stream upstream of a combustion zone.

* * * * *